Nov. 30, 1954 D. E. RUTTER 2,695,733
LATCHING MECHANISM FOR SEED DISPENSING UNITS
Filed Sept. 23, 1952 2 Sheets-Sheet 1

INVENTOR.
Donald E Rutter
BY
ATTORNEY

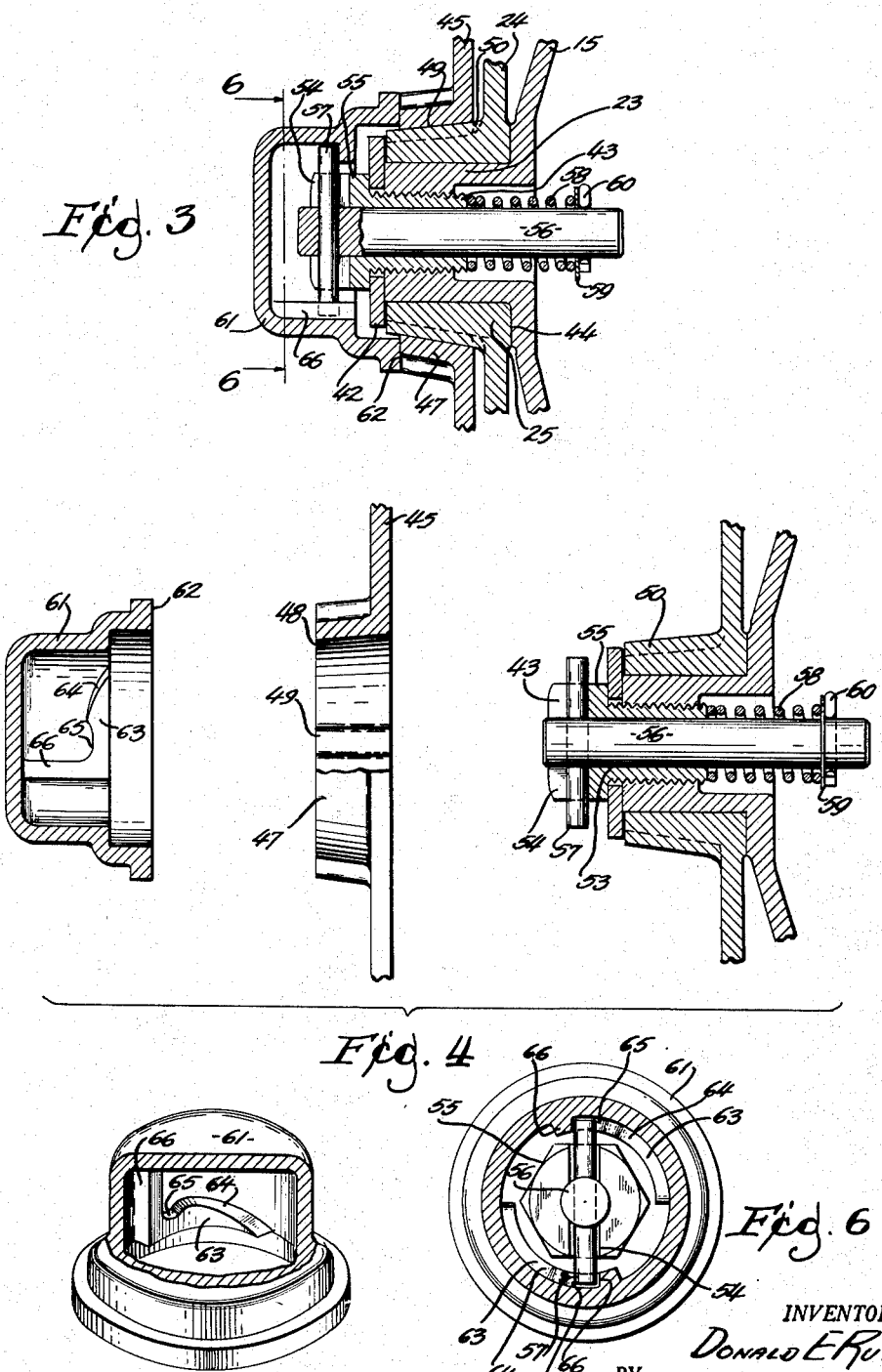

United States Patent Office 2,695,733
Patented Nov. 30, 1954

2,695,733

LATCHING MECHANISM FOR SEED DISPENSING UNITS

Donald E. Rutter, Rockford, Ill., assignor to J. I. Case Company, Racine, Wis., a corporation of Wisconsin Application September 23, 1952, Serial No. 310,969

14 Claims. (Cl. 222—288)

The present invention relates to a latching mechanism and more particularly to a latching mechanism for use with a seed dispensing machine for holding a seed metering plate in its proper position in a seed box while still permitting the seed metering plate to be easily and readily moved therefrom without the aid of any hand tools.

It is the primary object of the present invention to provide improved means for holding a seed metering plate in its proper position in a seed box and which, because of its unique structure, enables the operator to readily remove the seed plate which is positioned in the seed box and replace the same with a seed metering plate for a different size seed without the aid of any tools and in a very short time.

Further objects of the present invention will be apparent to those skilled in the art after a perusal of the following specification and drawings in which:

Fig. 3 is a sectional view of certain structure shown in Fig. 1, slightly enlarged.

Fig. 4 is an exploded view of the structure shown in Fig. 3 showing the seed plate removed from the seed plate driving gear.

Fig. 5 is a perspective view of certain structure shown in Fig. 3, with a portion thereof broken away so as to show details in construction.

Fig. 6 is a cross-sectional view taken on the line 6—6 of Fig. 3.

Figure 1:
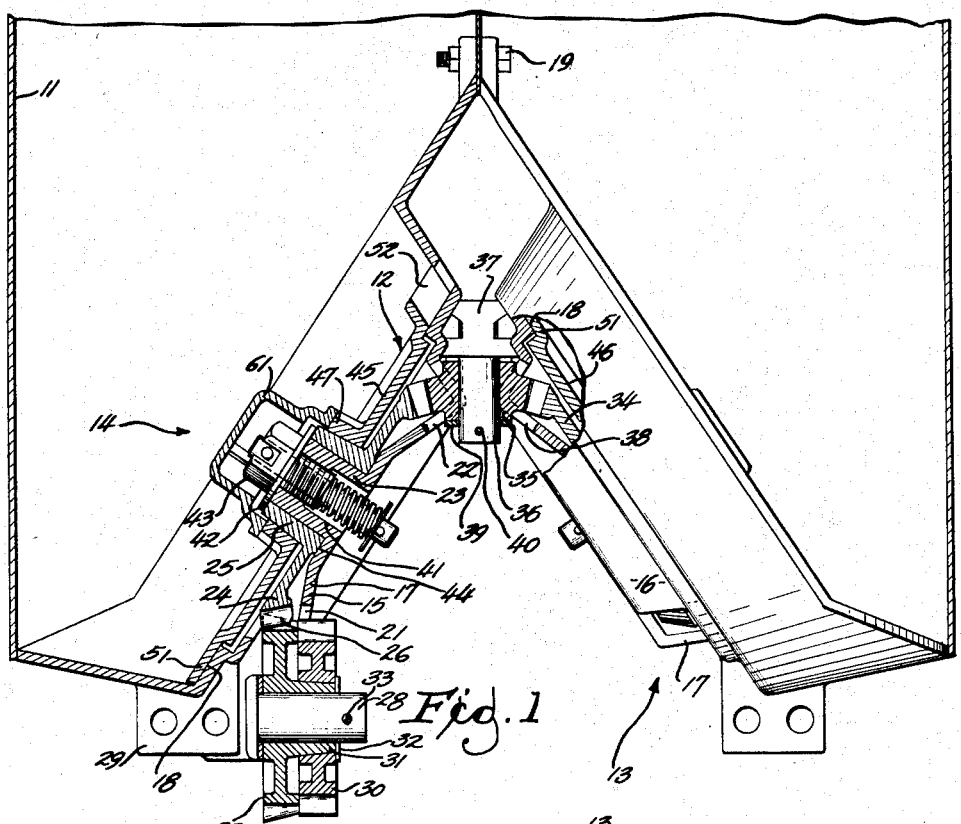
Fig. 1 is a side-elevational view of a seed dispensing unit of the duplex type embodying the present invention, with parts removed, and with parts broken away to show details in construction.
Figure 2:
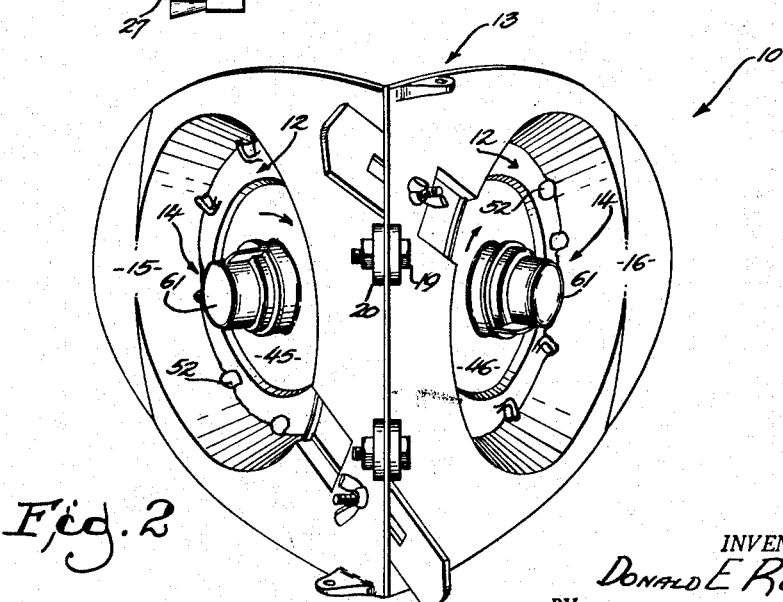
Fig. 2 is a plan view of the seed dispensing unit shown in Fig. 1, slightly reduced in size, and with parts removed.

Referring in detail to Figs. 1 and 2 of the drawings, the present invention is shown as being embodied in a seed dispensing unit of the duplex type designated generally by the number 10 and which consists of the primary units of a seed can 11, seed metering units 12, a hopper or base portion 13, and latching mechanisms 14 for holding the seed metering units 12 in their proper seed dispensing positions with respect to the base portion 13 while providing for the quick removal of these seed dispensing units so that the same can be easily and quickly removed and replaced. It will be apparent that innumerable ways are known for mounting a seed dispensing unit of this construction in seed dispensing relationship with respect to the ground, and it may be mounted on any suitable carriage whether it be horse-drawn, tractor-drawn, tractor-mounted, or drawn by any other suitable mechanism. It will also be appreciated that a seed dispensing unit of this construction can be used singly or in multiples and they can be mounted on a tractor or other carriage, and numerous ways for supplying the necessary power for driving a seed dispensing unit of this construction are well known in the art. Since the present invention is not concerned with the method of mounting a seed dispensing unit of this type on a suitable supporting structure, nor with means for supplying power to the mechanism, these constructions have been omitted from the drawings and the following description so that the present invention will be more readily and easily understood and appreciated.

The hopper bottom or base portion 13 is formed in the present instance of base portions 15 and 16 respectively which can each be made from cast iron, cast steel, or other suitable material and which are formed dish-like in shape, each being provided with a suitable channel portion 17 and a bearing surface 18 which is in sliding relationship with respect to the respective seed metering units 12 as will be more fully appreciated hereinafter. The base portions 15 and 16 are positioned in upwardly inclined relationship and are secured adjacent its upper end by means of suitable bolts 19 which are received in suitable upwardly extending apertured lugs 20 of the respective base portions. The base portions are also stabilized adjacent their lower end by means of certain supporting structure which are usually provided for mounting seed dispensing units of this type on a tractor or other suitable carriage, however, as previously suggested, the present invention is not concerned with the method of mounting a unit of this type so that the same is not shown in the drawings. It will be appreciated however, that the base portion 15 and 16 are rigidly secured together in upwardly inclined relationship so as to form a unitary structure.

Since the base portion 16 and its associated mechanisms are identical in construction to the base portion 15 and its associated mechanisms, further discussion of these associated mechanisms shall be limited to their association with base portion 15 except insofar as it is deemed necessary to refer to base portion 16 in order to fully describe the present invention. The base portion 15 has formed in the channel portion 17 thereof substantially opposed openings 21 and 22, and positioned near the center of the base portion 15 is a cylindrical protrusion or hub portion 23 which serves as a journal for a seed plate driving gear 24. The seed plate driving gear 24 is provided with a hub portion 25 which is received on the hub portion 23, and suitable gear teeth 26 are formed on the outer periphery of the driving gear 24 so as to be positioned in the channel portion 17. The teeth 26 of the driving gear 24 are positioned in intermeshing relationship with the teeth of a driving sprocket 27 which in turn is journaled on a spindle 28. The spindle 28 is suitably fixed to a downwardly depending lug 29 and a power receiving sprocket 30 is axially received on an axially extending hub 31 of driving sprocket 27 so as to effect a driving connection between power receiving sprocket 30 and driving sprocket 27. The driving sprocket 30 is so positioned as to receive the necessary driving power for transmitting the same to driving sprocket 27 and the driving sprocket 27 and power receiving sprocket 30 are axially positioned on the spindle 28 by means of a suitable washer 32 and a retainer pin such as a cotter pin or the like 33. The driving sprocket 27 is so positioned on the spindle 28 as to protrude sufficiently through the opening 21 formed in the base portion 15 to be in intermeshing or power transmitting relationship with respect to driving gear 24. A seed plate driving gear 34 is positioned in base portion 16 in an identical manner and the seed plate driving gear 24 is drivingly connected to the seed plate driving gear 34 by means of a suitable idler gear 35 rotatably journaled on a spindle 36. The spindle 36 is provided with a base portion 37 which is so shaped as to be wedged between the respective base portions 15 and 16 when the spindle 36 is properly positioned therebetween in a substantially vertical position and the idler gear 35 is of such a size as to protrude through the opening 22 formed in the base portion 15 and through a like opening 38 formed in the base portion 16 sufficiently to being in intermeshing relationship with respect to the gears 24 and 34. A washer 39 is axially received on the spindle 36 and retained in abutting relationship with respect to the idler 35 by means of a suitable retainer pin such as a cotter pin 40 for preventing axial displacement of the idler 35 on the spindle 36 as previously suggested. Numerous ways are known for supplying the necessary power to drive a seed dispensing unit of this type, and the driving power in the present instance is received by the power receiving sprocket 30 which in turn is drivingly connected with the sprocket 37, the power being transmitted therefrom to the seed plate driving gear 24 and consequently to the seed plate driving gear 34 by means of the idler sprocket 35, the seed plate driving gears 24 and 34 being driven at the same speed and in the same direction.

The hub portion 25 of the base portion 15 is provided with an axial bore 41, and the seed plate driving gear 24 is securely held on the journal 25 by means of a washer 42 and a cap screw 43, the cap screw 43 being threaded into the cylindrical bore 41 so as to confine the seed plate driving gear 24 axially between the washer 42 and a surface 44 of the base portion 15.

The seed metering units 12 comprise in the present instance seed plates 45 and 46 of any suitable or well known construction, each of which includes a hub portion 47 having an axial bore 48 formed therein and suitable key ways 49 formed axially on the opposite sides of the bore 48, see also Figs. 3 and 4. The seed plates 45 and 46 are axially received on the hub portion of each of the respective seed plate driving gears 24 and 34, a driving connection being effected between each of the seed plates and the hub of its respective seed plate driving gear by means of axially extending keys 50 which are adapted to be received by the key ways of the respective seed plates. The seed plates 45 and 46 are each provided with a peripheral portion 51 which is in sliding or bearing relationship with respect to the surface 18 of the respective base portions 15 and 16, and suitable seed traps 52 are formed on the outer periphery of each of the seed plates for trapping the seeds and carrying the same into discharging position in a manner well known in the art. It is desirable in machines of this type that means be provided for enabling the operator to exchange the seed plates 45 and 46 with seed plates for dispensing a different size seed so that the same machine can be used for the planting of many different types and sizes of seeds. Toward this end, the latching means 14 is provided for permitting the quick attachment or removal of a seed plate to the hub portions of the respective seed plate driving gears 24 and 34, and since the latching mechanism shown in connection with said plate 45 is identical with the latching mechanism shown in connection with the seed plate 46, further discussion of this latching mechanism will be limited to its application with respect to said plate 45.

The latching mechanism includes in the present instance an axial bore 53 formed in the cap screw 43, and a transverse slot 54, see also Fig. 6, formed in a head 55 of the cap screw 43, the slot 54 intersecting the axial bore 53. A plunger 56 is slidably received in the axial bore 53 and is provided adjacent one end thereof with a retainer pin 57 which is fixed in the plunger 56 so as to extend radially therefrom on opposite sides thereof, the pin 57 being formed of a length sufficient to extend radially beyond the opposite sides of the head 55 of the cap screw 43 when the pin 57 is received in the slot 54. The plunger 56 is formed of a length sufficient to provide for the other end thereof to protrude axially through the bore 53 when the retainer pin 57 is received in the slot 54, and a suitable spring 58 encircles that portion of the plunger 56 which protrudes axially through the bore 53, the spring 58 being compressed between the end of the cap screw 43 and a washer 59 received by the plunger 56 and fixed with respect to axial movement in one direction by means of a cotter pin or the like 60. It will be appreciated therefore that the compressive force of the spring 58 urges the plunger 56 axially in the bore 53 and that the axial movement of the plunger in the bore 53 is limited only by the retainer pin 57 being moved into abutting relationship with respect to the head 55 of the cap screw 43 or with respect to the slot 54. Thus the plunger 56 is loaded by initial compression of spring 58 on assembly.

A hub cap 61, which is cup-shaped, encloses the head 55 of the cap screw 43 and is provided with a peripheral abutting surface 62 which is so formed as to be in abutting relationship with respect to the peripheral surface of the hub portion 47 of the seed plate 45. The hub cap 61 is provided on the inner circumferential surface thereof with a pair of opposed inwardly extending cam lugs 63, see also Fig. 5, each of which have formed thereon a cam track 64 and a retention groove 65. The cam lugs 63 are so formed as to engage those portions of the retainer pin extending radially from the opposite sides of the head 55 upon rotation of the hub cap 61 in one direction, and upon continued rotation of the hub cap 61 in one direction, the plunger 56 is moved axially in the bore 53 against the force exerted by the spring 58 upon the retainer pin 57 climbing or ascending the cam tracks 64. When the hub cap 61 has been moved in this one direction sufficiently to move the retainer pin 57 into the opposed retention grooves 65, the force exerted by the spring 58 is transmitted to the hub cap 61 and this force is sufficient, the hub 61 being in abutting relationship with respect to the hub 47 of the seed plate 45, to lock the seed plate in its proper seed dispensing position with respect to the base portion 15. It will be appreciated that spring retention of the seed plate assures positive frictional contact between the peripheral portion 51 of the seed plate 45 and bearing surface 18 of the base portion 15, besides compensating for any wear which may occur between these parts so as to eliminate the necessity of adjustments to be made by the operator. Each of the cam lugs 63 has formed adjacent the retention groove 65 a stop 66, and the hub cap 61, when turned so as to engage the retainer pin 57, is turned in the same direction as the direction of rotation of the seed plate 45 so that upon the retainer pin 57 being received in the retention grooves 65, the direction of rotation of seed plate 45 will tend to lock the retainer pin in the retention grooves in abutting relationship with the stops 66. More specifically, when the hub cap 61 is properly positioned in latching relationship with respect to the seed plate 45, the direction of rotative movement of the seed plate 45 will tend to move the hub cap rotatably in a like direction, however, since the retainer pin 57 is locked in the groove 54, the hub cap 61 is held against rotative movement in this direction by means of the retainer pin, the sliding frictional engagement between the hub cap and the seed plate tending to move the hub cap so as to position the stops 66 in abutting relationship with respect to the retainer pin 57. The cam lugs 63 are preferably formed of a size sufficient to move the retainer pin 57 into the retention grooves 65 upon a quarter turn of the hub cap 61, however, the degree to which the hub cap 61 has to be turned in order to move the plunger 56 axially sufficiently to hold the hub cap 61 against the seed plate 45 by means of the force exerted by the spring 58 is a matter of discretion and not a part of the present invention. To remove the hub cap 61 so as to permit removal of the seed plate 45, the hub cap is turned in the opposite direction, or in the direction opposite to the direction of rotation as the seed plate, sufficiently to move the retainer pin 57 out of the retention grooves 65 and off the cam tracks 64, the hub cap 61 then being free of any connection to the plunger 56 or retainer pin 57. The seed plate 45 can then be easily removed from the seed plate driving gear 29 in a manner as previously described.

It will be appreciated that the slot 54 formed in the head 55 of the cap screw 43, which receives the retainer pin 57 as previously described, prevents rotational movement of the plunger 56 with respect to the cap screw 43. This definitely locates the retainer pin 57 and enables the operator to easily locate the hub cap 61 against the seed plate 45. Also, the cam tracks 64 of the lugs 63 do not axially move the plunger 56 sufficiently to move the retainer pin 57 out of the groove 54 when the hub cap is moved into a locked position with respect to the seed plate. This definitely prevents rotational movement of the retainer pin 57 and plunger 56 with respect to the cap screw 43.

It should be understood that it is not intended to limit the invention to the particular forms and details described hereinabove and that the invention includes such other forms and modifications which are embraced by the scope of the appended claims.

It is claimed and desired to secure by Letters Patent:

1. In a seed dispensing unit having a base provided with a hub portion, a power receiving sprocket journaled on said hub portion, and a seed plate drivingly connected to said driving sprocket and in seed dispensing relationship with respect to said base, a hub, and resilient means for urging said hub against said seed plate for maintaining said seed plate in its proper seed dispensing position with respect to said base upon said hub's being turned in one direction a predetermined amount, and for releasing said hub from said seed plate for permitting said seed plate to be removed from said base upon said hub's being turned in the opposite direction a predetermined amount.

2. In a seed dispensing unit having a base provided with a hub portion, a power receiving sprocket journaled on said hub portion, and a seed plate drivingly connected to said sprocket and in seed dispensing relationship with respect to said base, a hub cap in abutting relationship with respect to said seed plate, a pin slidably received by said hub portion and enclosed adjacent one end thereof by said hub cap, interconnecting means between said hub cap and said pin for axially moving said pin in one direction upon said hub cap's being turned a predetermined amount, and resilient means for biasing said pin in the other direction for urging said hub cap against said seed plate upon said pin's being moved in said one direction by said hub cap.

3. The construction recited in claim 2 further characterized by means preventing rotative movement of said pin.

4. In a seed dispensing unit having a base provided with a hub portion, a power receiving sprocket journaled on said hub portion, and a seed plate drivingly connected to said sprocket and in seed dispensing relationship with respect to said base, a hub cap, said hub cap being provided with a cam track on the inner circumference thereof, a pin slidably received in said hub portion and adapted to be enclosed adjacent one end by said hub cap when said hub cap is positioned in abutting relationship with respect to said seed plate, said pin having a cam track receiving portion adjacent one end thereof, and means for biasing said pin in one direction for urging said hub cap in abutting relationship with respect to said seed plate upon said cam track's receiving portion being received by said cam track and for releasing said hub cap upon said cap's being turned in one direction a predetermined amount for releasing said cam track from said cam track receiving portion.

5. The construction recited in claim 4 further characterized by means preventing rotative movement of said pin in said hub portion.

6. A latching mechanism for holding a removable element to a non-removable element, said non-removable element having formed thereon a hub portion, a pin slidably received by said hub portion, means for preventing rotation of said pin with respect to said non-removable element, a hub cap received by said hub portion and in abutting relationship with respect to said removable element, resilient means for biasing said pin in one direction, and means between said hub cap and said pin for urging said pin against the force exerted by said resilient means upon said hub cap's being turned in one direction a predetermined amount, said hub cap being positioned in abutting relationship with respect to said removable element upon said pin's being urged to move against the force exerted by said last mentioned means.

7. A latching mechanism for holding a removable element to a non-removable element, said non-removable element including an attaching portion for receiving said removable element, said latching mechanism comprising a hub cap positioned in abutting relationship with respect to said removable element, a pin slidably received by said non-removable element and enclosed adjacent one end thereof by said hub cap, said pin being biased to move out of said hub cap, and means on the inner circumference of said hub cap for engaging said pin upon rotation of said hub cap in one direction for urging said pin axially in the opposite direction, the force exerted tending to move said pin out of said hub cap tending to maintain said hub cap in abutment with said removable element with a force sufficient to maintain said removable element in its proper position with respect to said non-removable element.

8. A latching mechanism for holding a removable element to a non-removable element, said non-removable element including an attaching portion for receiving said removable element, said latching mechanism comprising a hub cap positioned in abutting relationship with respect to said removable element, said hub cap having a cam track formed on the inner circumference thereof, a pin slidably received by said non-removable element and enclosed adjacent one end thereof by said hub cap, said pin having formed adjacent said one end a retainer pin positioned to be received by said cam track upon rotative movement of said hub cap in one direction, said cam track urging said pin axially in one direction upon said hub cap's being further rotated in said one direction, means preventing rotative movement of said pin, and resilient means for urging said pin axially in the opposite direction, the force exerted by said resilient means tending to maintain said hub cap in abutment with said removable element with a force sufficient to maintain said removable element in its proper position with respect to said non-removable element upon said retainer pin's being received by said cam track.

9. In a seed dispensing unit, a base having a hub portion formed thereon, said hub portion having formed therein an axial bore, a seed plate driving gear journaled on said hub portion, a cap screw threaded into said axial bore for positioning said driving gear on said hub portion, said cap screw having formed therein an axial bore, a seed plate received by said driving gear and drivingly connected thereto and positioned in seed dispensing relationship with respect to said base, a hub cap in abutting relationship with respect to said seed plate and enclosing the end of said cap screw, said hub cap having formed on the inner circumference thereof an inwardly extending cam lug, a pin slidably received in the bore formed in said cap screw, said pin having formed adjacent one end thereof a retainer pin positioned within said hub cap and so formed as to be engaged by the cam lug of said hub cap upon said hub cap's being turned in one direction a predetermined amount, said cam lug urging said pin axially out of said bore formed in said cap screw upon said hub cap's being turned a predetermined amount, and resilient means carried adjacent the other end of said pin for urging said pin axially in the other direction for maintaining said hub cap in abutment with respect to said seed plate in its proper seed dispensing position with respect to said base.

10. In a seed dispensing unit having a base with a hub portion formed thereon, said hub portion having formed therein an axial bore, a driving sprocket journaled on said hub portion and being in power receiving position, and a seed plate received by said driving sprocket and drivingly connected thereto and being positioned in seed dispensing relation with respect to said base, a seed plate retainer mechanism for securing said seed plate on said driving sprocket in its proper position with respect to said base, said mechanism comprising a cap screw threaded into the hub portion of said base, said cap screw having formed therein an axial bore and the head of said cap screw having formed therein a transverse slot, a pin slidably received in said axial bore, said pin having a cross head at one end of said pin adapted to fit in the transverse slot formed in said cap screw head, a spring received on the other end of said pin, a washer fixed to said pin and so positioned that the force exerted by said spring urges the cross shaped head into the longitudinal slot formed in the head of said cap screw, and a cap having opposed cam lugs formed on the inner circumference thereof for urging said cross head against the force exerted by said spring upon rotation of said cap, the ends of said cap abutting the seed plate so as to retain the seed plate in its proper position upon said cap's being turned a predetermined amount.

11. In a seed dispensing unit having a base with a hub portion formed thereon, said hub portion having formed therein an axial bore, a driving sprocket journaled on said hub portion and being in power receiving position and a seed plate received by said driving sprocket and drivingly connected thereto and being in seed dispensing relation with respect to said base, a seed plate retainer mechanism for securing said seed plate on said driving sprocket in its proper position with respect to said base, said mechanism comprising a cap screw threaded into the hub portion of said base for positioning said driving sprocket on said hub portion, said cap screw having formed therein an axial bore and the head of the cap screw having formed therein a transverse slot, a pin slidably received in the second mentioned axial bore, said pin having a cross head adjacent one end thereof adapted to fit in the transverse slot formed in said cap screw head, a spring received on the other end of said pin, a washer fixed to said pin and so positioned that the force exerted by said spring urges the cross head into said transverse slot, and a hub cap positioned in abutting relationship with respect to said seed plate and enclosing the head of said cap screw, said hub cap having formed on the inner circumference thereof opposed cam lugs having cam tracks formed thereon and a retention groove formed in the respective cam tracks wherein upon rotational movement of said hub cap in one direction said cam tracks will be moved into engaging position with respect to said cross head and upon further rotational movement of said hub cap in said one direction said pin will be moved axially against the force exerted by said spring by said cam tracks, said cross head being received by said retention grooves upon a predetermined rotational movement of said hub cap, the force exerted by said spring urging said hub cap against said seed plate with a force sufficient to retain said seed plate in its operating position with respect to said base.

12. In a seed dispensing unit having a base with a hub portion formed thereon, said hub portion having formed therein an axial bore, a seed plate driving gear journaled on said hub portion and in power receiving position, and a seed plate received by said seed plate driving gear and drivingly connected thereto and in seed dispensing relation with respect to said base, a seed plate retainer mechanism for securing said seed plate on said driving gear in its proper position with respect to said base, said mechanism comprising a cap screw threaded into the hub portion of said base for positioning said driving gear on said hub portion, said cap screw having formed therein an axial bore and the head of said cap screw having formed therein a transverse slot intersecting said axial bore, a pin slidably received in the second mentioned axial bore, said pin having a cross-head formed adjacent one end thereof adapted to fit in the transverse slot formed in said cap screw head, a spring received on the other end of said pin, retaining means fixed to said pin for compressing said spring so that the force exerted thereby tends to urge the cross-head of said pin into said transverse slot, and a hub cap positioned in abutting relationship with respect to said seed plate and enclosing the head of said cap screw, said hub cap having formed on the inner circumference thereof a cam lug having a cam track formed thereon wherein upon rotational movement of said hub cap in one direction said cam track will be moved into engaging position with respect to said cross-head and upon further rotational movement of said hub cap in said one direction said pin will be moved axially against the force exerted by said spring upon said cross-head ascending said cam track, and a stop formed on the inner circumference of said hub cap adjacent the end of said cam track and in abutting relationship with respect to said cross-head upon said hub cap's being turned in said one direction a predetermined amount, the abutment of said stop against said cross-head preventing further rotative movement of said hub cap upon said seed plate's being driven in said one direction.

13. In a seed dispensing unit having a base provided with a hub portion, a power receiving sprocket journaled on said hub portion, a seed plate drivingly connected to said sprocket and in seed dispensing relationship with respect to said base, and a seed can secured to said base and surrounding said seed plate, sufficient clearance being provided between the inside surface of said seed can and the outer circumference of said seed plate to permit said seed plate to be easily removed from inside said seed can, a hub cap in abutting relationship with respect to said seed plate, a pin slidably received in said hub portion and enclosed adjacent one end thereof by said hub cap, interconnecting means between said hub cap and said pin for axially moving said pin in one direction upon said hub cap being turned a predetermined amount, and resilient means for biasing said pin in the other direction for urging said hub cap against said seed plate upon said pin being moved in said one direction by said hub cap.

14. In a seed dispensing unit, a base having a hub portion formed thereon, said hub portion having formed therein an axial bore, a seed plate driving gear journaled on said hub portion, a cap screw threaded into said axial bore for positioning said driving gear on said hub portion, said cap screw having formed therein an axial bore, a seed plate received by said driving gear and drivingly connected thereto and positioned in seed dispensing relationship with respect to said base, a seed can secured to said base and surrounding said seed plate, the diameter of the inner circumference of said seed can being sufficiently greater than the diameter of said seed plate to permit said seed plate to be easily removed from inside said seed can, a hub cap in abutting relationship with respect to said seed plate and enclosing the end of said cap screw, said hub cap having formed on the inner circumference thereof an inwardly extending cam lug, a pin slidably received in the bore formed in said cap screw, said pin having formed adjacent one end thereof a retainer pin positioned within said hub cap and so formed as to be engaged by the cam lug of said hub cap upon said hub cap being turned in one direction a predetermined amount, said cam lug urging said pin axially out of said bore formed in said cap screw upon said hub cap being turned a predetermined amount, and resilient means carried adjacent the other end of said pin for urging said pin axially in the other direction for maintaining said hub cap in abutment with respect to said seed plate in its proper seed dispensing position with respect to said base.

References Cited in the file of this patent

UNITED STATES PATENTS

| Number | Name | Date |
| --- | --- | --- |
| 242,063 | Sidener | May 24, 1881 |
| 1,039,788 | Packham | Oct. 1, 1912 |
| 1,652,696 | Beard et al. | Dec. 13, 1927 |